(12) United States Patent
Jalali et al.

(10) Patent No.: US 10,765,132 B2
(45) Date of Patent: Sep. 8, 2020

(54) SYSTEMS AND METHODS FOR UTILIZING A SONICATION PROBE TO COOK RICE

(71) Applicant: Walmart Apollo, LLC, Bentonville, AR (US)

(72) Inventors: Rohit Jalali, Bentonville, AR (US); Shari R. Baxter, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/514,110

(22) Filed: Jul. 17, 2019

(65) Prior Publication Data

US 2020/0022529 A1 Jan. 23, 2020

Related U.S. Application Data

(60) Provisional application No. 62/701,329, filed on Jul. 20, 2018.

(51) Int. Cl.
*A47J 27/10* (2006.01)
*A23L 5/30* (2016.01)
(Continued)

(52) U.S. Cl.
CPC ............... *A23L 5/32* (2016.08); *A23L 5/13* (2016.08); *A47J 27/10* (2013.01);
(Continued)

(58) Field of Classification Search
CPC ...... A47J 27/10; A47J 27/21; A47J 27/21083; A47J 27/21091; A23L 5/10; A23L 5/13; A23L 5/32
(Continued)

(56) References Cited

U.S. PATENT DOCUMENTS

| 7,337,706 B2 | 3/2008 | Shiraishi |
|---|---|---|
| 9,497,982 B1 | 11/2016 | Sinz |

(Continued)

FOREIGN PATENT DOCUMENTS

| CN | 103416677 | 12/2013 |
|---|---|---|
| CN | 104207021 | 12/2014 |

(Continued)

OTHER PUBLICATIONS

PCT; App. No. PCT/US2019/042144; International Search Report and Written Opinion dated Oct. 7, 2019.

*Primary Examiner* — Reginald Alexander
(74) *Attorney, Agent, or Firm* — Fitch, Even, Tabin & Flannery LLP

(57) ABSTRACT

In some embodiments, apparatuses and methods are provided herein useful to utilizing a sonication probe. In some embodiments, there is provided a system for utilizing a sonication probe to cook rice including a housing; a pH sensor; a temperature sensor; a viscosity sensor; an ultrasonic generator; a memory; and a control circuit configured to: receive a desired shelf life value of one or more shelf life values; obtain a first predetermined combination of a plurality of different predetermined combinations corresponding to the desired shelf life value; control an operation of the ultrasonic generator; determine the pH value, the temperature value, and the viscosity value; determine whether each of the pH value, the temperature value, and the viscosity value are respectively within a corresponding threshold; and in response, cause the ultrasonic generator to stop emitting one or more sound waves to substantially halt breakdown of amylose of the rice.

13 Claims, 6 Drawing Sheets

Figure 1:
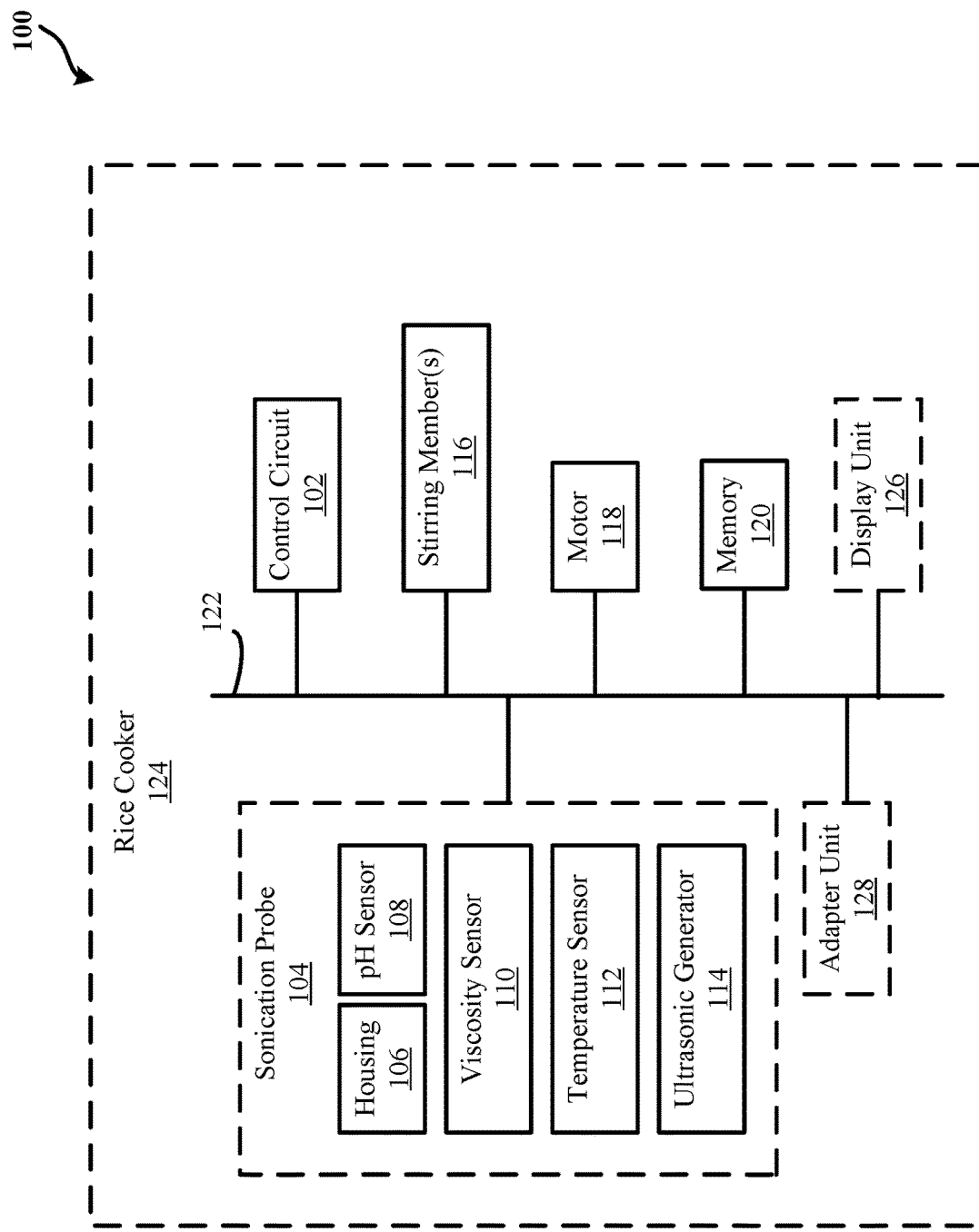

(51) Int. Cl.
*A23L 5/10* (2016.01)
*A47J 27/21* (2006.01)
*A47J 27/12* (2006.01)

(52) U.S. Cl.
CPC ........... *A47J 27/21083* (2013.01); *A23L 5/10* (2016.08); *A47J 27/12* (2013.01)

(58) Field of Classification Search
USPC .................................. 99/330, 348, 403, 409
See application file for complete search history.

(56) References Cited

U.S. PATENT DOCUMENTS

| | | | |
|---|---|---|---|
| 9,801,489 | B2 | 10/2017 | Tan |
| 2006/0032381 | A1 | 2/2006 | Shiraishi |
| 2011/0117259 | A1 | 5/2011 | Storek |
| 2013/0216673 | A1* | 8/2013 | Storek ........................ A23L 5/13 426/509 |
| 2015/0068409 | A1 | 3/2015 | Tanaka |
| 2015/0190012 | A1 | 7/2015 | Kumon |
| 2015/0320252 | A1* | 11/2015 | Tan ......................... A47J 27/21 426/509 |

FOREIGN PATENT DOCUMENTS

| | | |
|---|---|---|
| CN | 105725735 | 7/2016 |
| CN | 107296479 | 10/2017 |
| JP | 2015139544 | 8/2015 |
| KR | 1019970032570 | 7/1997 |
| KR | 2019990030926 | 7/1999 |
| KR | 200268818 | 3/2002 |
| WO | 2013021325 | 2/2013 |
| WO | 2015044858 | 4/2015 |

\* cited by examiner

SYSTEMS AND METHODS FOR UTILIZING A SONICATION PROBE TO COOK RICE

CROSS-REFERENCE TO RELATED APPLICATION(S)

This application claims the benefit of U.S. Provisional Application No. 62/701,329 filed Jul. 20, 2018, which is incorporated herein by reference in its entirety.

TECHNICAL FIELD

This invention relates generally to cooking utilizing a sonication probe.

BACKGROUND

Generally, a cooked rice that has been left out will harden, dry out, and/or look unpalatable to consume.

BRIEF DESCRIPTION OF THE DRAWINGS

Disclosed herein are embodiments of systems, apparatuses and methods pertaining to utilizing a sonication probe to cook rice. This description includes drawings, wherein:

FIG. 1 illustrates a simplified block diagram of an exemplary system for utilizing a sonication probe to cook rice in accordance with some embodiments;

FIG. 2 shows an illustrative simplified block diagram of an exemplary sonication probe utilized in cooking rice in accordance with some embodiments;

FIG. 3 shows an illustrative simplified block diagram of an exemplary system for utilizing a sonication probe to cook rice in a rice cooker in accordance with some embodiments;

FIG. 4 shows a flow diagram of an exemplary process of utilizing a sonication probe to cook rice in accordance with some embodiments;

FIG. 5 illustrates an exemplary system for use in implementing methods, techniques, devices, apparatuses, systems, servers, sources and utilizing a sonication probe to cook rice, in accordance with some embodiments; and FIG. 6 shows an illustrative simplified block diagram of an exemplary system for utilizing a sonication probe to cook rice in a rice cooker in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for utilizing a sonication probe to cook sushi rice. In some embodiments, a sonication probe includes an ultrasonic generator. For example, the ultrasonic generator may emit one or more sound waves within one or more sets of predefined frequency ranges to breakdown amylose of the sushi rice. By one approach, the sonication probe may include a housing comprising one or more stirring members extending out on a portion of a surface of the housing and used to stir the sushi rice in a container. In one example, the ultrasonic generator may be secured by the housing. Alternatively or in addition to, the sonication probe may include a pH sensor secured by the housing. For example, the pH sensor may provide a first measurement of a pH value associated with the sushi rice. Alternatively or in addition to, the sonication probe may include a temperature sensor secured by the housing. For example, the temperature sensor may provide a second measurement of a temperature value associated with the sushi rice. Alternatively or in addition to, the sonication probe may include a viscosity sensor secured by the housing. For example, the viscosity sensor may provide a third measurement of a viscosity value associated with the sushi rice. Alternatively or in addition to, the sonication probe may include a memory secured by the housing. For example, the memory may store one or more shelf life values; a plurality of different predetermined combinations each comprising a predefined pH value, a predefined temperature value and a predefined viscosity value; and/or an association between each of the plurality of different predetermined combinations and a particular shelf life value of the one or more shelf life values.

By one approach, the sonication probe may include a control circuit that may be secured by the housing and/or may be operatively coupled with the pH sensor, the temperature sensor, the viscosity sensor, the ultrasonic generator, and/or the memory. In one configuration, the control circuit may receive a desired shelf life value of the one or more shelf life values. Alternatively or in addition to, the control circuit may obtain, from the memory, a first predetermined combination of the plurality of different predetermined combinations corresponding to the desired shelf life value. Alternatively or in addition to, the control circuit may control an operation of the ultrasonic generator. In one configuration, the control circuit may determine the pH value based on the first measurement, the temperature value based on the second measurement, and/or the viscosity value based on the third measurement. In another configuration, the control circuit may determine whether each of the pH value, the temperature value, and/or the viscosity value are respectively within a corresponding threshold of a first predefined pH value, a first predefined temperature value, and/or a first predefined viscosity value of the first predetermined combination. Alternatively or in addition to, the control circuit, in response to the determination that each of the pH value, the temperature value, and/or the viscosity value are respectively within the corresponding threshold of the first predefined pH value, the first predefined temperature value, and/or the first predefined viscosity value, may cause the ultrasonic generator to stop emitting the one or more sound waves to substantially halt the breakdown of the amylose of the sushi rice.

In some embodiments, a system utilizing a sonication probe to cook rice includes a sonication probe. In one configuration, the sonication probe may include a housing coupled to one or more stirring members. Alternatively or in addition to, the sonication probe may include a pH sensor secured by the housing. For example, the pH sensor may provide a first measurement of a pH value associated with the rice. Alternatively or in addition to, the sonication probe may include a temperature sensor secured by the housing. For example, the temperature sensor may provide a second measurement of a temperature value associated with the rice. Alternatively or in addition to, the sonication probe may include a viscosity sensor secured by the housing. For example, the viscosity sensor may provide a third measurement of a viscosity value associated with the rice. Alternatively or in addition to, the sonication probe may include an ultrasonic generator secured by the housing. For example, the ultrasonic generator may emit one or more sound waves within one or more sets of predefined frequency ranges to break down amylose of the rice.

By one approach, the system may include a rice cooker configured to cook the rice. By another approach, the system may include the one or more stirring members configured to stir the rice in the rice cooker. By another approach, the system may include a motor coupled to the rice cooker and the one or more stirring members. For example, the motor may rotate the one or more stirring members. In one configuration, the sonication probe may be coupled to the motor and the one or more stirring members. By another approach, the system may include a memory. In one configuration, the memory may store one or more shelf life values; a plurality of different predetermined combinations each comprising a predefined pH value, a predefined temperature value and a predefined viscosity value; and/or an association between each of the plurality of different predetermined combinations and a particular shelf life value of the one or more shelf life values. By another approach, the system may include a control circuit operatively coupled to the rice cooker, the motor, the sonication probe, and/or the memory. In one configuration, the control circuit may receive a desired shelf life value of the one or more shelf life values. Alternatively or in addition to, the control circuit may obtain, from the memory, a first predetermined combination of the plurality of different predetermined combinations corresponding to the desired shelf life value. Alternatively or in addition to, the control circuit may control an operation of the ultrasonic generator. Alternatively or in addition to, the control circuit may determine the pH value based on the first measurement, the temperature value based on the second measurement, and/or the viscosity value based on the third measurement. Alternatively or in addition to, the control circuit may determine whether each of the pH value, the temperature value, and/or the viscosity value are respectively within a corresponding threshold of a first predefined pH value, a first predefined temperature value, and/or a first predefined viscosity value of the first predetermined combination. Alternatively or in addition to, the control circuit, in response to the determination that each of the pH value, the temperature value, and/or the viscosity value are respectively within the corresponding threshold of the first predefined pH value, the first predefined temperature value, and/or the first predefined viscosity value, may cause the ultrasonic generator to stop emitting the one or more sound waves to substantially halt breakdown of amylose of the rice.

In some embodiments, a method for utilizing a sonication probe in cooking rice may include receiving, at a control circuit, a desired shelf life value of one or more shelf life values of cooked rice stored in a memory. For example, the memory may store a plurality of different predetermined combinations each comprising a predefined pH value, a predefined temperature value and/or a predefined viscosity value. Alternatively or in addition to, the memory may store an association between each of the plurality of different predetermined combinations and a particular shelf life value of the one or more shelf life values. By one approach, the method may include obtaining from the memory, by the control circuit, a first predetermined combination of the plurality of different predetermined combinations corresponding to the desired shelf life value. Alternatively or in addition to, the method may include controlling, by the control circuit, an operation of an ultrasonic generator secured by a housing of a sonication probe that is at least partially immersed in at least rice mixture in a container. Alternatively or in addition to, the method may include determining, by the control circuit, a pH value of the at least rice mixture based on a first measurement of a pH sensor secured by the housing, a temperature value of the at least rice mixture based on a second measurement of a temperature sensor secured by the housing, and/or a viscosity value of the at least rice mixture based on a third measurement of a viscosity sensor secured by the housing. Alternatively or in addition to, the method may include determining, by the control circuit, whether each of the pH value, the temperature value, and/or the viscosity value are respectively within a corresponding threshold of a first predefined pH value, a first predefined temperature value, and/or a first predefined viscosity value of the first predetermined combination. Alternatively or in addition to, the method may include, in response to the determination that each of the pH value, the temperature value, and/or the viscosity value are respectively within the corresponding threshold of the first predefined pH value, the first predefined temperature value, and/or the first predefined viscosity value, causing, by the control circuit, the ultrasonic generator to stop emitting the one or more sound waves to substantially halt breakdown of amylose in the at least rice mixture.

To illustrate, FIGS. 1 through 6 are described below.

FIG. 1 illustrates a simplified block diagram of an exemplary system 100 that utilizes a sonication probe 104 in cooking rice. The system 100 includes the sonication probe 104. In one configuration, the system 100 may include a pH sensor 108, a viscosity sensor 110, a temperature sensor 112, and/or an ultrasonic generator 114. The system 100 may, in some applications, additionally include one or more stirring members 116, one or more motors 118, one or more adapter units 128, and/or one or more user interfaces, which may include a display unit 126, LED lights, buttons, touch screen, etc. In some configurations, the system 100 may further include a control circuit 102 coupled to one or more computer memory 120. The control circuit communicatively couples with the pH sensor 108, the viscosity sensor 110, the temperature sensor 112, and/or the ultrasonic generator 114 to receive sensor data and/or notifications of detected states relative to corresponding thresholds. In some applications, the control circuit is coupled with the motor 118 to control the rate of stirring by the one or more stirring members 116. In some embodiments, the system 100 includes one or more communication buses 122 providing communicative coupling between the components of the system. By one approach, the communication bus 122 may include a communication system that transfers data between electronic components and/or electronic devices. By another approach, the communication bus 122 may include one or more communication networks (e.g., Internet, WIFI, wired network, wireless network, and/or the like), internal buses, and external buses, among other types of communication buses capable of connecting and/or transferring data between electronic components and/or electronic devices.

Alternatively or in addition to, the system 100 may include a rice cooker 124. In some embodiments, the sonication probe 104 may include the pH sensor 108, the viscosity sensor 110, the temperature sensor 112, and/or the ultrasonic generator 114 that is/are secured internally and/or externally by a housing 106. Alternatively or in addition to, the sonication probe 104 may include the control circuit 102, the memory 120, and/or the communication bus 122. Alternatively or in addition to, the sonication probe 104 may include the one or more stirring members 116, the motor 118, the adapter unit 128, and/or the display unit 126. In an illustrative non-limiting example, the sonication probe 104 may include the housing 106. In one example, the housing 106 may entirely or at least partially enclose the pH sensor 108, the viscosity sensor 110, the temperature sensor 112, and/or the ultrasonic generator 114.

In another example, the one or more stirring members 116, the adapter unit 128, and/or the display unit 126 may be detachably and/or separately coupled to the housing 106. Alternatively, the one or more stirring members 116, the adapter unit 128, and/or the display unit 126 may be integrated with the housing 106. For example, the sonication probe 104 may include the motor 118 to operate the one or more stirring members 116. In one implementation, the housing 106 may enclose the control circuit 102 and/or the memory 120. In another implementation, the control circuit 102 and/or the memory 120 may be communicatively coupled to the sonication probe 104 via the communication bus 122. For example, the communication bus 122 may include wired network and/or wireless network. As such, the control circuit 102 may transmit to and/or receive data from (e.g., control data, sensor data, status, and/or the like) the sonication probe 104. For example, the sonication probe 104 and/or attached component/devices may be remotely operated and/or controlled by the control circuit 102. In another example, the sonication probe 104 in cooperation with the control circuit 102 may access stored information and/or databases in the memory 120.

Figure 6:
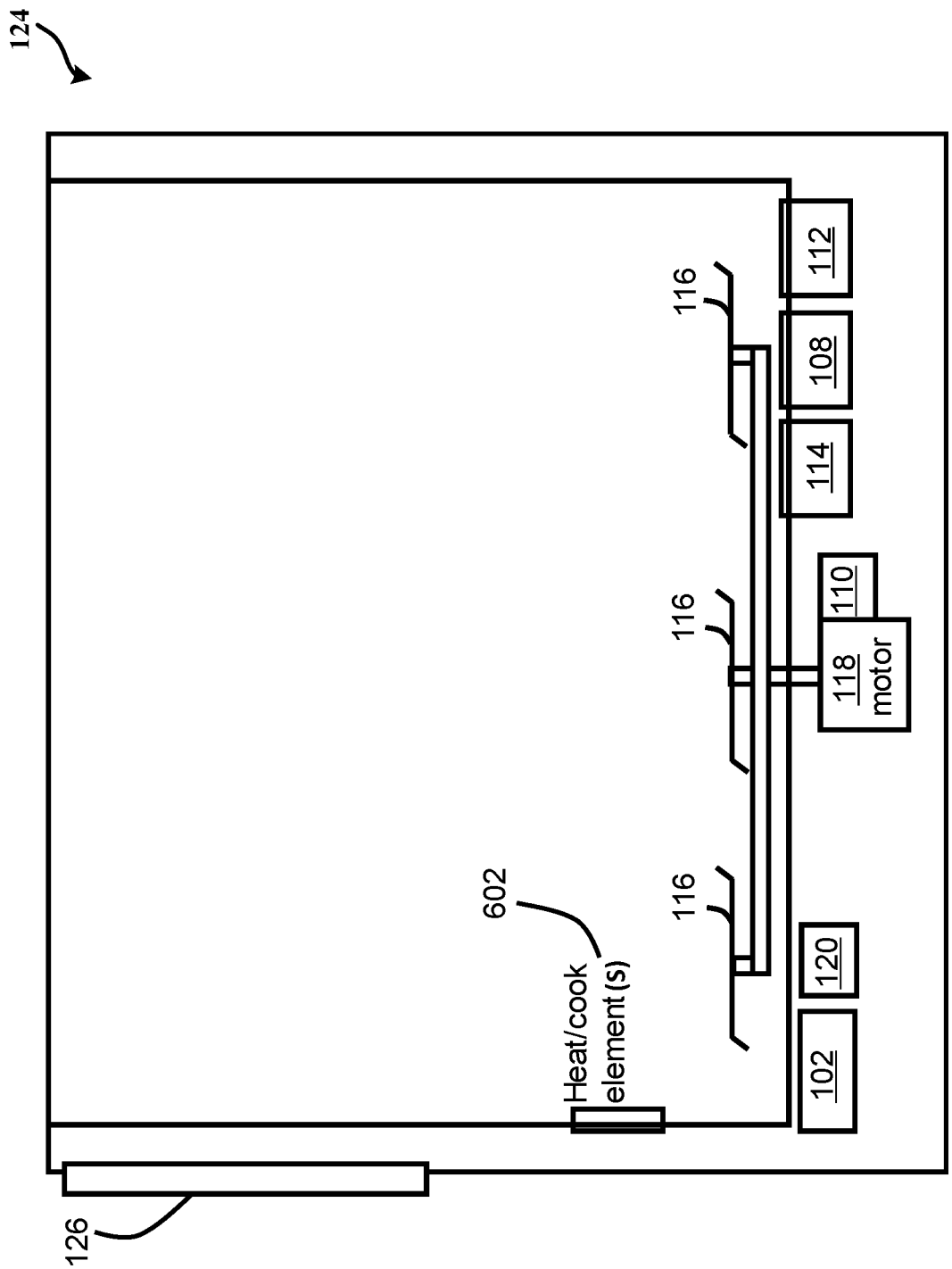

In another illustrative non-limiting example, the rice cooker 124 may detachably couple with the sonication probe 104 via the adapter unit 128. For example, the adapter unit 128 may include one or more hardware components cooperatively working to attach and/or couple the sonication probe 104 with the rice cooker 124. In one configuration, the adapter unit 128 may be integrated with the rice cooker 124 and configured to couple with the sonication probe 104. In another configuration, the display unit 126 may be integrated with the rice cooker 124 and configured to communicatively couple with the sonication probe 104. In one example, the display unit 126 may receive one or more input from a user and configured to provide data corresponding to the one or more input to the sonication probe 104 and/or the control circuit 102 via the communication bus 122. In one example, the communication bus 122 may both include an external network or Internet and an internal network. For example, the display unit 126 may communicate with the control circuit 102 that may be integrated with the sonication probe 104 via the Internet while the control circuit 102 may operate and/or control the motor 118 and/or one or more components housed by the housing 106 of the sonication probe 104 via the internal network that is configured to provide communications between the one or more components housed by the housing 106. In yet another illustrative non-limiting example, one or more elements/components illustrated and/or described in FIGS. 1-3 may be integrated with the rice cooker 124. In some embodiments, the integrated rice cooker 124 may be illustrated as shown in FIG. 6. In yet some embodiments, the integrated rice cooker 124 may include one or more elements/components illustrated and/or described in FIG. 6. By one approach, one or more heat/cook elements may include commercially available heating/cooking elements, halogen bulbs, electric coil, and induction elements, among other types of heating/cooking elements that supply a source of heat applied to cooking rice.

Those skilled in the art will recognize that a wide variety of combinations can also be made with respect to the components described above as being part of system 100 of FIG. 1 without departing from the scope of the invention, and that such combinations are to be viewed as being within the ambit of the inventive concept.

In another illustrative non-limiting example, the sonication probe 104 may be utilized to generally cook rice and/or particularly to cook sushi rice. By using the sonication probe 104, the cooked rice and/or sushi rice stay fresher for a particular period of time. To illustrate, the housing 106 may include the one or more stirring members 116 that extend out on a portion of a surface of the housing 106. In one example, the one or more stirring members 116 may be used to stir the sushi rice in a container as the sushi rice is being cooked. In one configuration, the container may include the rice cooker 124, a stovetop rice pot, slow cooker, and/or the like. In another configuration, each of the one or more stirring members 116 may be positioned diagonally on an entire and/or at least a portion of the surface of the housing 106 and adjacent to one another. In one example, the housing 106 may have a structure that is generally cylindrical shaped like a probe. In another example, the housing 106 may have a structure that is generally spherical shaped, generally cubic shaped, pyramid shaped, and/or any shape or combination of shapes that is capable of housing at least one or more of the above described components of the sonication probe 104. In one implementation, the pH sensor 108 may be secured by the housing 106 and/or entirely or at least partially housed inside the housing 106. For example, the pH sensor 108 may include one or more commercially available sensors and/or a system of sensors configured to measure acidity or alkalinity of water soluble substances (e.g., rice or sushi rice and liquid, for example water, mixture) and that can be cooperated with the housing 106 of the sonication probe 104, incorporated with the rice cooker 124, or the like. By one approach, the pH sensor 108 may provide measurements of pH values associated with the sushi rice or any type of rice that is in the process of being cooked. In some applications, the pH sensor is activated by a command from the control circuit 102 that controls the timing of when pH values are acquired. Similarly, in some instances, the frequency of the measurements may vary depending on one or more previous pH measurements, a state of cooking and/or a duration of cooking (e.g., increased rate of measurements in response to pH reaching one or more thresholds, and/or increased or decreased rate as the rice approaches threshold cooked state). This can reduce the battery consumption of the sonication probe 104. In other implementations, the control circuit 102 may trigger the pH sensor 108 to measure the pH of the sushi rice and/or the sushi rice mixture (e.g., the sushi rice mixture may include sushi rice and/or any type of rice, water, rice wine vinegar, and/or any type of cooking liquid(s) (e.g., vinegar, soy sauce, etc.), spice(s) (e.g., salt, sugar, pepper, etc.), and/or one or more ingredients that are added to the sushi rice mixture to enhance the taste, flavor, texture, quality, and/or look of the sushi rice). By one approach, the control circuit 102 may trigger the pH measurement of the sushi rice and/or the sushi rice mixture when the sonication probe 104 or the rice cooker 124 is initiated. By another approach, the pH measurement of the sushi rice and/or the sushi rice mixture may be triggered by securing the rice cooker 124 with a cover 302 of the rice cooker 124 of FIG. 3. In another implementations, one or more cooking liquids, spices, ingredients may be added to the sushi rice mixture while being cooked. In such implementations, the control circuit 102 may trigger the pH sensor 108 on one or more predefined time periods to acquire pH values of the sushi rice mixture.

In one implementation, the temperature sensor 112 may be secured by the housing 106 and/or entirely or at least partially housed inside the housing 106. For example, the temperature sensor 112 may include one or more commercially available sensors, a system of sensors, thermometer(s), thermal pads, temperature conductive material positioned to be exposed to the sushi rice (or any type of rice), and/or an instrument capable of measuring and/or indicating temperature. By one approach, the temperature sensor 112 may provide measurements of temperature values associated with the sushi rice or any type of rice that is in the process of being cooked. In some embodiments, the one or more temperature sensors 112 may continuously monitor a temperature of the sushi rice environment, while in other instances the temperature is measured in response to an instruction from the control circuit 102, based on a predefined rate, dependent on threshold temperatures detected, a state of cooking, a duration of cooking, other such factors, or a combination of such factors. In another example, the one or more temperature sensors 112 may increase rate of temperature measurement as a function of one or more threshold values (e.g., time threshold values, rate threshold values, etc.) being reached. For example, the control circuit 102 may increase the rate of temperature measurement when the sushi rice has been cooking for 10 minutes. In another example, the one or more temperature sensors 112 may increase rate of temperature measurement based on other sensor's input and/or output values. For example, the control circuit 102 may increase the rate of temperature measurement when the viscosity sensor 110 measures a viscosity value corresponding to a predefined threshold value.

In another implementation, the viscosity sensor 110 may be secured by the housing 106 and/or entirely or at least partially housed inside the housing 106. For example, the viscosity sensor 110 may include one or more commercially available mechanical devices capable of measuring at least one of kinematic (flow) viscosity, intrinsic (friction) viscosity, and/or other types of devices capable of measuring viscosity. In an example, the viscosity sensor 110 may be cooperated with the motor 118 and measure and/or detect viscosity based on resistance against the rotating motion of the one or more stirring members 116. By one approach, the viscosity sensor 110 may provide a third measurement of a viscosity value associated with the sushi rice or any type of rice that is in the process of being cooked. In yet another implementation, the ultrasonic generator 114 may be secured by the housing 106 and/or entirely or at least partially housed inside the housing 106. For example, the ultrasonic generator 114 may include one or more devices capable of producing and/or emitting one or more sound waves within one or more sets of predefined frequency ranges to breakdown amylose of the sushi rice or any type of rice while being cooked. By one approach, the one or more sets of predefined frequency ranges may include frequencies in the ultrasonic frequency range of the electromagnetic spectrum.

In an illustrative non-limiting example, the memory 120 may store one or more shelf life values, a plurality of different predetermined combinations each comprising a predefined pH value, a predefined temperature value and a predefined viscosity value, and/or an association between each of the plurality of different predetermined combinations and a particular shelf life value of the one or more shelf life values. By one approach, a shelf life value of the sushi rice (or any type of rice) desired or selected by a user may in part determine the amount of broken down amylose and/or for how long the amylose of the sushi rice is broken down by the sonication probe 104. In one configuration, the amount of time or a period of time that the amylose of the sushi rice is broken down may be based on values each read and/or measured by the pH sensor 108, the viscosity sensor 110, and/or the temperature sensor 112. As such, each particular shelf life value of the sushi rice corresponds to a particular combination of a pH value, a temperature value, and/or a viscosity value. In an illustrative non-limiting example, the memory 120 may store a plurality of associations between each of the plurality of different predetermined combinations of a predefined pH value, a predefined temperature value and a predefined viscosity value and a particular shelf life value. The values and/or changes of values over time of temperature, and viscosity can be used to determine modifications to be implemented in cooking (e.g., temperature variation, rate of stirring, etc.) and/or changes in rates of sensing. A rice cooker environment maybe different from one rice cooker to another which can result in variations in time depending on the type of rice cooker. Accordingly, the variations in one or more of the values of pH, temperature, and viscosity, in some embodiments, are used to determine modifications and/or achieve a particular type of freshness. For example, a user may select a desired shelf life value of the sushi rice via the display unit 126 and/or an electronic device associated with the user. Subsequent to the selection of the desired shelf life value, the control circuit 102 may initiate the pH sensor 108 to measure the pH of the sushi rice mixture. By one approach, the pH sensor 108 may measure the pH of the sushi rice mixture only once at the start of the cooking process of the sushi rice. By another approach, the pH of the sushi rice mixture may be measured by the pH sensor 108 over a predefined period of time. In such an approach, the pH may be measured regardless of whether there is a change from previous measured pH values. Based on the measured pH value of the sushi rice mixture, the control circuit 102 may access the memory 120 to determine a temperature value and/or a viscosity value associated with the measured pH value and the desired shelf life value. In some instances, the control circuit 102 may initiate operation of the ultrasonic generator 114 to emit one or more sound waves until the sushi rice mixture has a measured temperature value and/or a measured viscosity value that is/are substantially equal to or within a threshold range of the determined temperature value and/or viscosity value stored in the memory 120. In other instances, a change of a pH value associated with the sushi rice mixture may trigger the control circuit 102 to redetermine the temperature value and/or the viscosity value. In such instances, when the redetermined temperature and/or viscosity values are reached and/or each within a corresponding threshold value, the control circuit 102 may initiate stoppage of emission of the one or more sound waves generated by the ultrasonic generator 114. By one approach, the control circuit 102 may re-access the memory 120 to determine another temperature value and/or another viscosity value associated with the most currently measured pH value and the desired shelf life value.

In one configuration, the sonication probe 104 may stop emission of the one or more sound waves when a particular predetermined combinations of a pH value, a temperature value and a viscosity value are read and/or measured by the pH sensor 108, the temperature sensor 112, and the viscosity sensor 110, respectively. Thus, when the particular predetermined combinations have been measured, the sonication probe 104 may determine that the desired shelf life value of the sushi rice has been reached and/or has substantially been reached.

In an illustrative example, a user may select a first desired shelf life value of the rice to be cooked using the rice cooker 124 and/or a cooking pot. Subsequent to the selection, the pH sensor 108 may measure a pH value associated with the rice and the liquid used to cook the rice. In one configuration, the control circuit 102 may determine a plurality of temperature values and/or a plurality of viscosity values corresponding to the measured pH value through an access to the memory 120. In such a configuration, each temperature value of the plurality of temperature values, each viscosity value of the plurality of viscosity values, or each combination of temperature and viscosity values may correspond to a particular shelf life value of the rice. As such, the control circuit 102 may determine a particular temperature value and/or a particular viscosity value corresponding to the first desired shelf life value selected by the user based on the measured pH value of the rice. By one approach, while the rice is being cooked, the ultrasonic generator 114 of the sonication probe 104 may continue emitting one or more sound waves in the rice mixture until the temperature sensor 112 and/or the viscosity sensor 110 obtain a measurement each corresponding to the particular temperature value and/or the particular viscosity value determined by the control circuit 102 to be corresponding to the first desired shelf life value selected by the user. The emission of the one or more sound waves generated by the ultrasonic generator 114 will not change the measured pH value of the rice mixture while the rice is being cooked. Instead, the emission by the ultrasonic generator 114 may at least affect the temperature value and/or the viscosity value of the rice mixture over time while the rice is being cooked. Thus, the length of time of the emission of the one or more sound waves by the ultrasonic generator 114 may be based at least in part on the measured pH value of the rice mixture and/or the first desired shelf life value selected by the user. In some configuration, the measured pH value may determine the power and/or the frequency or frequencies of the one or more sound waves emitted by the ultrasonic generator 114. In another illustrative example, the pH value of the rice mixture may be changed with addition of water or rice wine vinegar, among other type of cooking liquids and ingredients that are added to the rice mixture while the rice is being cooked to enhance the taste, flavor, texture, quality, and/or look of the rice after the rice has been out of the rice cooker 124 and/or the cooking pot for a period of time and/or while the rice is frozen and/or refrigerated for a period of time. In such an example, the pH sensor 108 may measure for a second time the pH value of the rice mixture. In response, the control circuit 102 may access the memory 120 to determine another temperature value and/or viscosity value that correspond to the first desired shelf life value selected by the user and the pH value measured by the pH sensor 108 at the second time. As such, the ultrasonic generator 114 of the sonication probe 104 may continue emitting one or more sound waves in the rice mixture until the temperature sensor 112 and/or the viscosity sensor 110 obtain a measurement each corresponding to the another temperature value and/or the another viscosity value determined by the control circuit 102.

In some embodiments, the control circuit 102 may be operatively coupled with the pH sensor 108, the temperature sensor 112, the viscosity sensor 110, the ultrasonic generator 114, and/or the memory 120. By one approach, the control circuit 102 may receive a desired shelf life value of one or more shelf life values. In one configuration, the desired shelf life value may be based on a selection received through the display unit 126 coupled to the control circuit 102. In one example, the display unit 126 may display at least one of options of the one or more shelf life values and a plurality of preset values stored in the memory 120. In such an example, a user may make the selection from at least one of the options and the plurality of preset values displayed on the display unit 126. In one implementation, the memory 120 may store a desired shelf life value as one of a plurality of preset values accessible to the control circuit 102. In such an implementation, the control circuit 102 may automatically receive, at a subsequent time, the desired shelf life value when a user selects the desired shelf life value as a default value. For example, at a first time, a user may select a 3-day shelf life value of the sushi rice (in some examples, the shelf life value may be in a percentage form, such as 20 percent shelf life value remains in 3 days). During the first time, the user may select to save the 3-day shelf life as one of the plurality of preset values stored in the memory 120. By one approach, the user may select to store the 3-day shelf life as a default value. In such an approach, the user may, through a selection of one of options presented on the display unit 126, choose to make the 3-day shelf life value as the default value and stored as one of the preset values in the memory 120. For example, during a second time, the default value may be displayed as one of the preset values on the display unit 126 selectable by the user. In another example, the default value may be automatically provided to the control circuit 102 at the second time the sonication probe 104 is used.

Alternatively or in addition to, the control circuit 102 may obtain, from the memory 120, a first predetermined combination of the plurality of different predetermined combinations corresponding to a desired shelf life value. In one example, the control circuit 102 may access the memory 120 in response to receiving the desired shelf life value. By one approach, the control circuit 102 may control an operation of the ultrasonic generator 114. For example, the control circuit 102 may provide, via the communication bus 122, control data to the ultrasonic generator 114. By one approach, the control data may correspond to a command signal from the control circuit 102 causing continues emission of one or more sound waves until the pH value, the temperature value, and/or the viscosity value are respectively within a corresponding threshold of a first predefined pH value, a first predefined temperature value, and/or a first predefined viscosity value in response to a determination that each of the pH value, the temperature value, and the viscosity value are respectively not within the corresponding threshold of the first predefined pH value, the first predefined temperature value, and the first predefined viscosity value. By another approach, the control data may correspond to a command signal to the ultrasonic generator 114 that causes the ultrasonic generator 114 to stop emitting one or more sound waves to substantially halt the breakdown of the amylose of the sushi rice in response to a determination that each of the pH value, the temperature value, and/or the viscosity value are respectively within the corresponding threshold of the first predefined pH value, the first predefined temperature value, and/or the first predefined viscosity value. Alternatively or in addition to, the control circuit 102 may determine the pH value based on a first measurement of the pH sensor 108, the temperature value based on a second measurement of the temperature sensor 112, and the viscosity value based on a third measurement of the viscosity sensor 110. For example, while the sushi rice is being cooked, the control circuit 102 may periodically and/or based on a predetermined period initiate a reading of a corresponding value from each of the pH sensor 108, the temperature sensor 112, and/or the viscosity sensor 110.

By one approach, the control circuit 102 may determine whether each of the pH value, the temperature value, and/or the viscosity value are respectively within a corresponding threshold of a first predefined pH value, a first predefined temperature value, and/or a first predefined viscosity value of a first predetermined combination of pH, temperature, and/or viscosity values determined based on the desired shelf life value received by the control circuit 102. In one example, each of the first predefined pH value, the first predefined temperature value, and/or the first predefined viscosity value may have a corresponding threshold. In one configuration, a threshold may include a range of values, a maximum value, a minimum value, a predetermined value, and/or the like. In an illustrative non-limiting example, the first predefined pH value may be associated with a threshold corresponding to a first number, the first predefined temperature value may be associated with a threshold corresponding to a first range of numbers, and/or the first predefined viscosity value may be associated with a threshold corresponding to a second number. In another example, a corresponding threshold may be associated with a particular predetermined combination of pH, temperature, and/or viscosity values. In another illustrative non-limiting example, a first predetermined combination of pH, temperature, and/or viscosity values may be associated with a threshold corresponding to a second range of numbers. In such an example, the control circuit 102 may determine whether the pH value is within the second range of numbers of the first predefined pH value, the temperature value is within the second range of numbers of the first predefined temperature value, and/or the viscosity value is within the second range of numbers of the first predefined viscosity value. In another illustrative non-limiting example, a second predetermined combination of pH, temperature, and/or viscosity values may be associated with a threshold corresponding to a third number. In such an example, the control circuit 102 may determine whether the pH value is within the third number of the first predefined pH value, the temperature value is within the third number of the first predefined temperature value, and/or the viscosity value is within the third number of the first predefined viscosity value.

In an illustrative non-limiting example, a retail manager may desire that the sushi rice that was cooked early on a day should still have 70 percent shelf life value by the end of the day. As such, the retail manager may desire to have a refrigerated sushi rice and/or a frozen sushi rice to look and/or taste 70 percent as relatively fresh and/or palatable as the time the sushi rice first came out of the rice cooker 124, for example. To achieve this, for example, the control circuit 102 may determine, based on an access to freshness-to-shelf value information stored in the memory 120, that a 70 percent shelf life value is a shelf life value that would enable the retail manager to achieve his/her desire to have a refrigerated sushi rice and/or a frozen sushi rice to look and/or taste as relatively fresh and/or palatable as the time the sushi rice first came out of the rice cooker 124 early on the day. In an example, the freshness-to-shelf value information may correspond to associations of a plurality of desirable day freshness of the sushi rice with corresponding shelf life values. As such, the retail manager may select a particular desirable day freshness through the display unit 126. By one approach, the control circuit 102 may determine, based on the received particular desirable day freshness, a corresponding shelf life value. In such an approach, the control circuit 102 may obtain, from the memory 120, a first predetermined combination of the plurality of different predetermined combinations corresponding to the corresponding shelf life value (e.g., the desired shelf life value) determined by the control circuit 102. Thus, a user may desire the sushi rice to have a particular look and/or taste at the end of the day relative to the look and/or taste of the sushi rice at the time the sushi rice first came out of the rice cooker 124. Depending on the look and/or taste desired by the user, the user may select a corresponding shelf life value through the display unit 126 and/or a display unit of an electronic device associated with the user. By one approach, the electronic device may be communicatively coupled to the sonication probe 104 and/or the rice cooker 124.

In some embodiments, the system 100 may include the motor 118 cooperatively coupled to the control circuit 102, the stirring members 116, and/or the viscosity sensor 110. In one configuration, the motor 118 may rotate the one or more stirring members 116 around a vertical axis of the housing 106 to stir the sushi rice inside the rice cooker 124. For example, the control circuit 102 may cause the motor 118 to stop the rotation of the one or more stirring members 116 in response to a determination that a viscosity value is within a corresponding threshold of a first predefined viscosity value. By one approach, the control circuit 102 in cooperation with the motor 118 and/or the viscosity sensor 110 may determine the viscosity of the sushi rice based on flow, friction, and/or ease of stirring and/or rotating of the one or more stirring members 116 through the sushi rice mixture. In some embodiments, the adapter unit 128 may detachably attach the sonication probe 104 to the rice cooker 124. In another embodiments, the sonication probe 104 may be integrated with the rice cooker 124.

Figure 2:
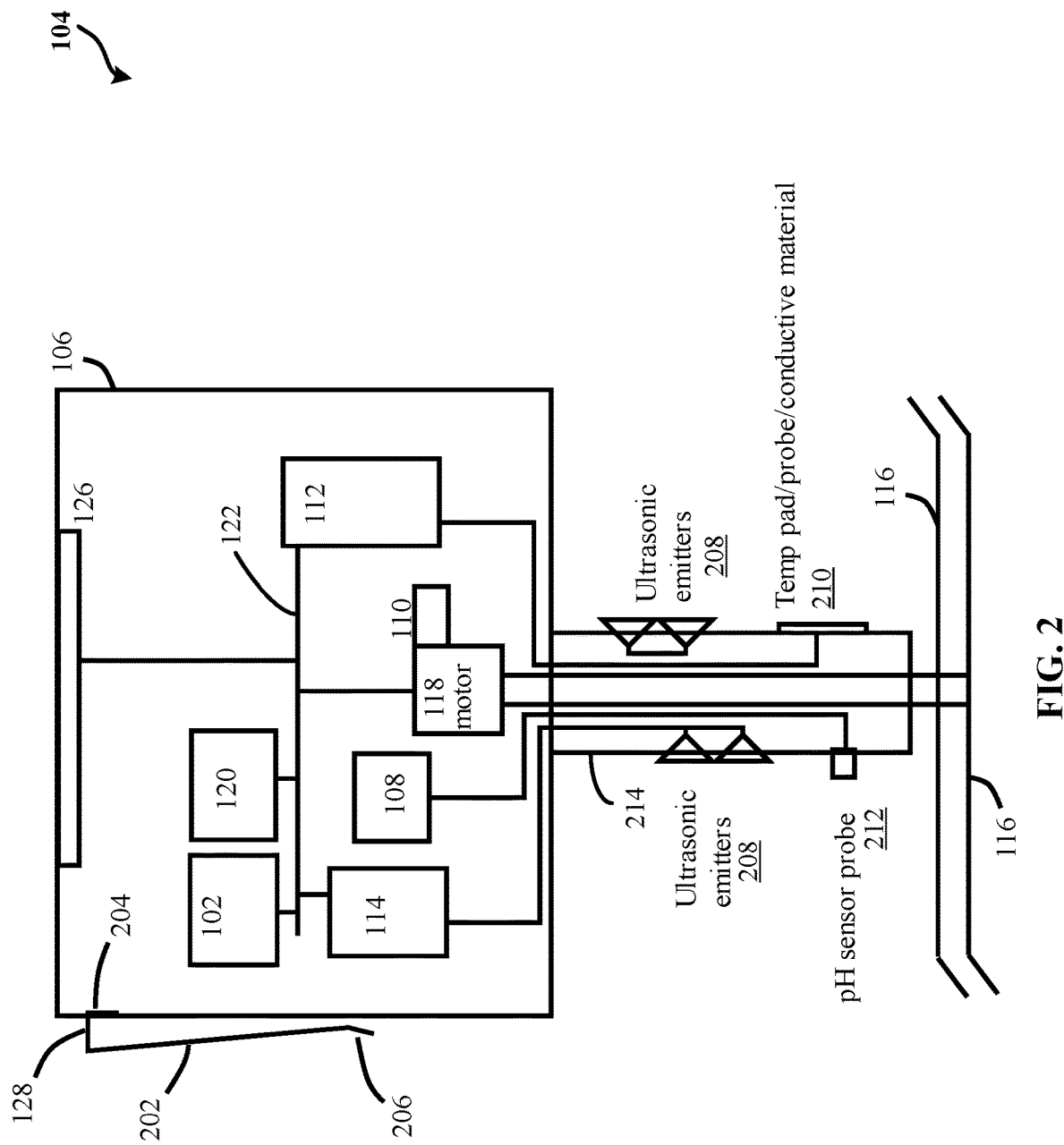

FIG. 2 shows an illustrative simplified block diagram of an exemplary sonication probe 104 utilized in cooking rice in accordance with some embodiments. In some embodiments, the sonication probe 104 may include the pH sensor 108, the viscosity sensor 110 in cooperation with the motor 118, the temperature sensor 112 coupled to a temperature (temp) pad, probe, and/or conductive material 210 configured to be in contact with the rice (and/or sushi rice) mixture, the ultrasonic generator 114 including one or more ultrasonic emitters 208, the control circuit 102, the stirring members 116, the memory 120, the communication bus 122, the adapter unit 128, the display unit 126, and/or the housing 106. By one approach, the sonication probe 104 may include the housing 106, a shaft 214, the adapter unit 128, and/or the stirring members 116. In one implementation, the shaft 214 may be coupled to the housing 106. In another implementation, the shaft 214 may be detachably coupled to the stirring members 116. In yet another implementation, the housing 106 may be detachably coupled to the adapter unit 128 including a securing plate 202, a first end 204, and a free second end 206. In one example, the securing plate 202 may be secured with and/or extends into the housing 106 at the first end 204. In such an example, the securing plate 202 may enable the free second end 206 of the securing plate 202, which is not secured with the housing 106, to flex away from the housing 106 to slide along an exterior of the rice cooker 124 while the spring biasing of the adapter unit 128 forces the housing 106 against an interior of the rice cooker 124 and pinching the wall of the rice cooker 124 between the securing plate 202 and the housing 106. In other embodiments, the adapter unit 128 may include one or more magnets within and/or secured with the housing 106 and configured to attach and/or secure the sonication probe 104 against the wall of the rice cooker 124. In one implementation, the shaft 214 may include the ultrasonic emitters 208 configured to transmit one or more predefined sound waves and/or ultrasonic frequencies, the temp pad, probe, and/or conductive material 210, and/or a pH sensor probe of the pH sensor 108 configured to be in contact with the rice (and/or the sushi rice mixture) of the rice cooker 124. By one approach, the ultrasonic emitters 208 may emit the one or more predefined sound waves and/or the ultrasonic frequencies in one or more directions. By another approach, the control circuit 102 may control the direction the one or more predefined sound waves and/or the ultrasonic frequencies are emitted. In another implementation, the control circuit 102 in cooperation with the viscosity sensor 110 and the motor 118 may control one or more speed rates of rotations of the one or more stirring members 116, duration of the rotations, directions of the rotations, and/or initiation and stopping of the rotations. In yet another implementation, the display unit 126 may be positioned opposite the shaft 214. In yet another implementation, the display unit 126 may be positioned on a surface of a side of the housing 106.

Figure 3:
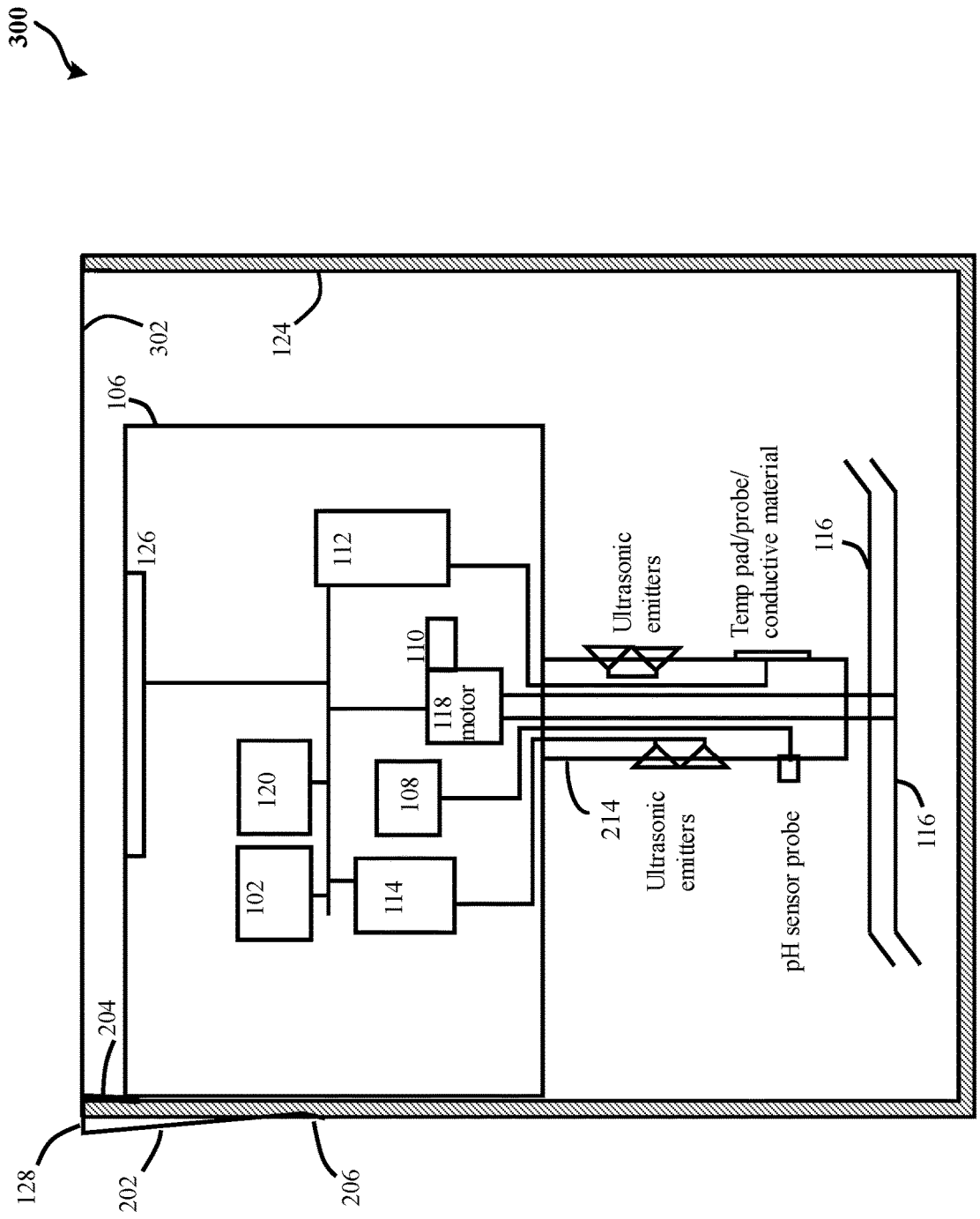

FIG. 3 shows an illustrative simplified block diagram of an exemplary system 300 for utilizing the sonication probe 104 of FIGS. 1 and 2 to cook rice in a rice cooker 124. By one approach, the sonication probe 104 may be configured to fit inside one or more rice cookers 124 and enclosed by cover 302 of the one or more rice cookers 124. In an illustrative non-limiting example, the first end 204 may be configured to enable the housing 106 to slide up and/or down relative to the wall of the rice cooker 124 and the cover 302 to fully enclose the sonication probe 104 and/or secure the rice cooker 124 while the rice cooker 124 is cooking the rice (and/or the sushi rice). In some embodiments, the shaft 214 may be substantially centered relative to the housing 106. In another embodiments, the shaft 214 may be offset relative to the center of the housing 106. In yet another embodiment, a user electronic device (not shown) may be operatively coupled to the sonication probe 104 and/or the rice cooker 124. By one approach, a user display of the user electronic device may display at least one of one or more status (e.g., remaining cooking time, amylose breakdown of the rice (and/or the sushi rice), user control options, etc.) of the sonication probe 104 and/or the rice cooker 124 and one or more sensor data measured and/or read by the pH sensor 108, the viscosity sensor 110, the temperature sensor 112, and/or the ultrasonic generator 114. By another approach, the user may wirelessly send operation instructions to the control circuit 102 through the user display of the user electronic device. In such an approach, the sonication probe may include one or more wireless transceiver configured to couple with a remote user electronic device (e.g., smart phone, remote computer, smart watch, and/or the like). By one approach, the operation instructions may include desired shelf life value, start and/or stop operations, configuration setup, and status query, among other types of instructions to control, operate, and/or use the rice cooker 124 and/or the sonication probe 104.

Figure 4:
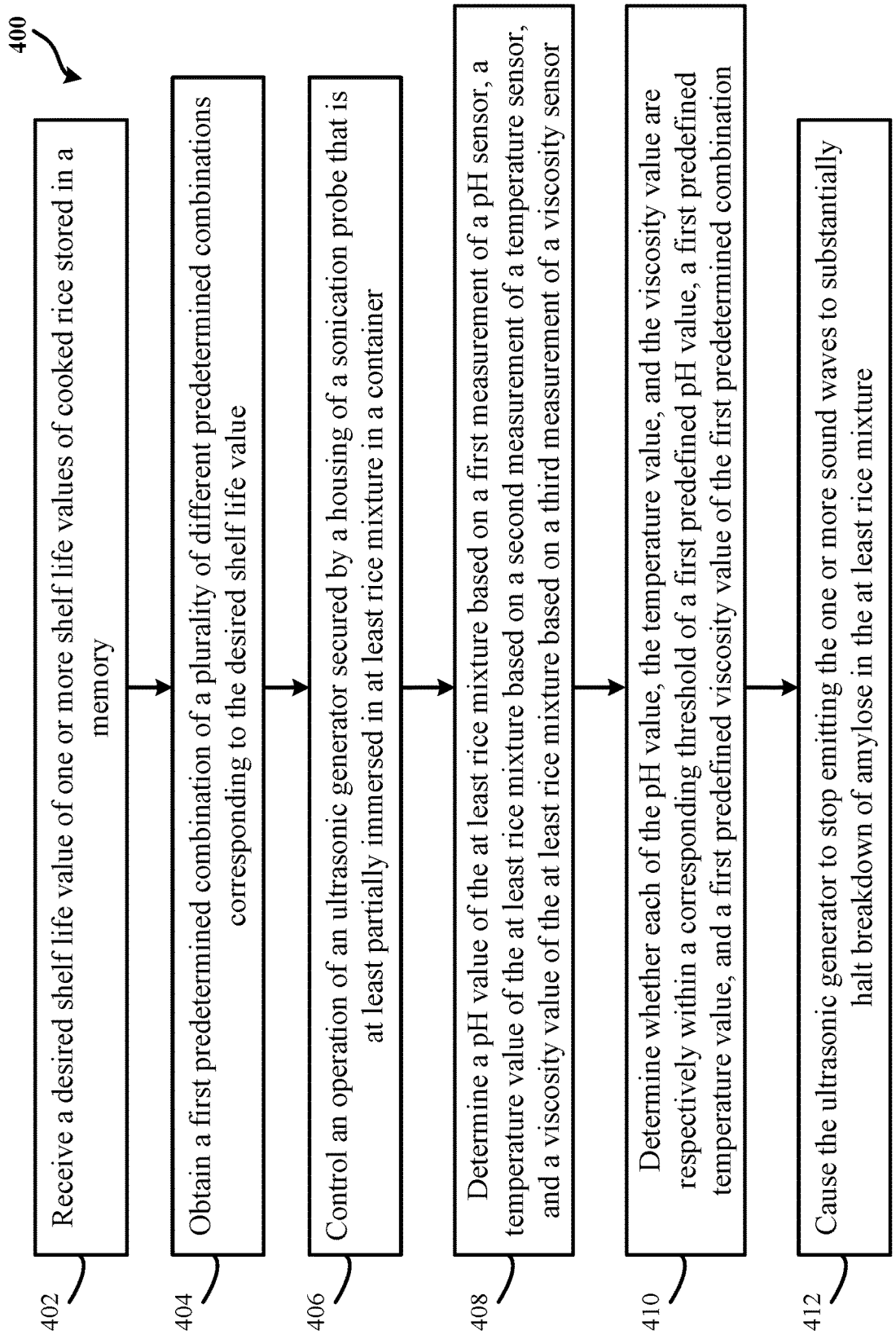

FIG. 4 illustrates a flow diagram of an exemplary method 400 for utilizing the sonication probe 104 to cook rice. The exemplary method 400 may be implemented in the system 100 of FIG. 1, the sonication probe 104 of FIG. 2, and/or the system 300 of FIG. 3. One or more steps in the method 400 may be implemented in the control circuit 102, the rice cooker 124, the sonication probe 104, the pH sensor 108, the viscosity sensor 110, the temperature sensor 112, the ultrasonic generator 114, the stirring members 116, the motor 118, the memory 120, the communication bus 122, the adapter unit 128, and/or the display unit 126 of FIGS. 1-3. The method 400 includes, at step 402, receiving, at a control circuit, a desired shelf life value of one or more shelf life values of cooked rice stored in a memory. In one configuration, the memory may store a plurality of different predetermined combinations each comprising a predefined pH value, a predefined temperature value and/or a predefined viscosity value. Alternatively or in addition to, the memory may store an association between each of the plurality of different predetermined combinations and a particular shelf life value of the one or more shelf life values. By one approach, the method 400 may include, at step 404, obtaining from the memory, by the control circuit, a first predetermined combination of the plurality of different predetermined combinations corresponding to the desired shelf life value. By one approach, the method 400 may include controlling, by the control circuit, an operation of an ultrasonic generator secured by a housing of a sonication probe that is at least partially immersed in at least rice mixture in a container, at step 406. By another approach, the method 400 may include, at step 408, determining, by the control circuit, a pH value of the at least rice mixture based on a first measurement of a pH sensor secured by the housing, a temperature value of the at least rice mixture based on a second measurement of a temperature sensor secured by the housing, and/or a viscosity value of the at least rice mixture based on a third measurement of a viscosity sensor secured by the housing. By another approach, the method 400 may include, at step 410, determining, by the control circuit, whether each of the pH value, the temperature value, and/or the viscosity value are respectively within a corresponding threshold of a first predefined pH value, a first predefined temperature value, and/or a first predefined viscosity value of the first predetermined combination. Alternatively or in addition to, the method 400 may include, at step 412, causing, by the control circuit, the ultrasonic generator to stop emitting the one or more sound waves to substantially halt breakdown of amylose in the at least rice mixture in response to the determination that each of the pH value, the temperature value, and/or the viscosity value are respectively within the corresponding threshold of the first predefined pH value, the first predefined temperature value, and/or the first predefined viscosity value.

In some embodiments, the method 400 may include causing, by the control circuit, a motor coupled to the control circuit to stop rotating one or more stirring members coupled to the sonication probe in response to the determination that the viscosity value is within the corresponding threshold of the first predefined viscosity value. Alternatively or in addition to, the method 400 may include causing, by the control circuit, the ultrasonic generator to continue emitting the one or more sound waves until the pH value, the temperature value, and/or the viscosity value are respectively within the corresponding threshold of the first predefined pH value, the first predefined temperature value, and/or the first predefined viscosity value in response to the determination that each of the pH value, the temperature value, and/or the viscosity value are respectively not within the corresponding threshold of the first predefined pH value, the first predefined temperature value, and/or the first predefined viscosity value. In some configuration, the method 400 may include initiating storage to the memory of the desired shelf life value as one of a plurality of preset values accessible by the control circuit. In such a configuration, the method 400 may include automatically receiving, at a subsequent time, the desired shelf life value when a user selects the desired shelf life value as a default value. By one approach, the method 400 may include displaying at least one of options of the one or more shelf life values and the plurality of preset values. In such an approach, the method 400 may include receiving a selection from the at least one of the options and the plurality of preset values by a user. For example, the received desired shelf life value of the control circuit may be based on the selection.

Figure 5:
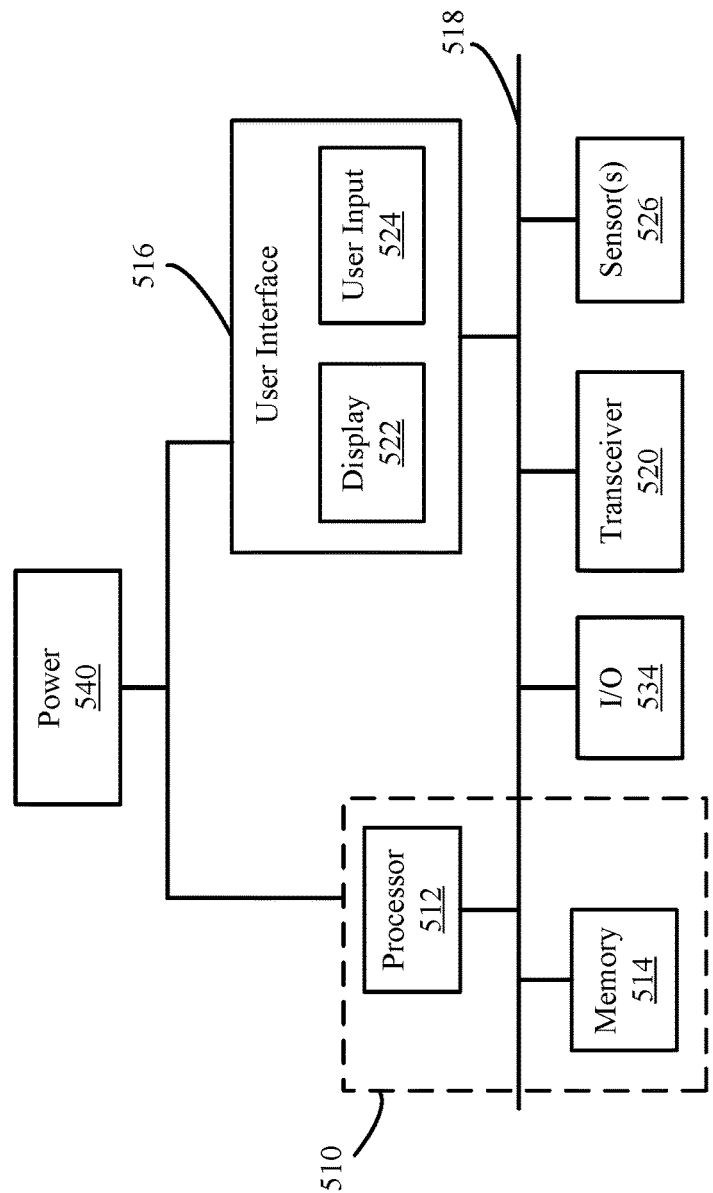

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the system 100 of FIG. 1, the method 200 of FIG. 2, the method 300 of FIG. 3, the method 400 of FIG. 4, and/or other above or below mentioned systems or devices, or parts of such circuits, circuitry, functionality, systems, apparatuses, processes, or devices. For example, the system 500 may be used to implement some or all of the system 100 for utilizing the sonication probe 104 to cook rice, the sonication probe 104, the pH sensor 108, the viscosity sensor 110, the temperature sensor 112, the ultrasonic generator 114, the rice cooker 124, the control circuit 102, the stirring members 116, the motor 118, the memory 120, the communication bus 122, the adapter unit 128, the display unit 126, and/or other such components, circuitry, functionality and/or devices. However, the use of the system 500 or any portion thereof is certainly not required.

By way of example, the system 500 may comprise a processor module (or a control circuit) 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system 500 may implement the system for utilizing the sonication probe 104 to cook rice with the control circuit 102 being the control circuit 512.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) interface 534 that allow one or more devices to couple with the system 500. The I/O interface can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system and/or sensor information that is communicated to another component, such as the sonication probe 104, the pH sensor 108, the viscosity sensor 110, the temperature sensor 112, the ultrasonic generator 114, the rice cooker 124, the control circuit 102, the stirring members 116, the motor 118, the memory 120, the communication bus 122, the adapter unit 128, the display unit 126, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A sonication probe utilized in cooking sushi rice comprising:
    a housing comprising one or more stirring members extending out on a portion of a surface of the housing and used to stir sushi rice in a container;
    a pH sensor secured by the housing, the pH sensor configured to provide a first measurement of a pH value associated with the sushi rice;
    a temperature sensor secured by the housing, the temperature sensor configured to provide a second measurement of a temperature value associated with the sushi rice;
    a viscosity sensor secured by the housing, the viscosity sensor configured to provide a third measurement of a viscosity value associated with the sushi rice;
    an ultrasonic generator secured by the housing, the ultrasonic generator configured to emit one or more sound waves within one or more sets of predefined frequency ranges to breakdown amylose of the sushi rice;
    a memory secured by the housing, the memory configured to store:
        one or more shelf life values;
        a plurality of different predetermined combinations each comprising a predefined pH value, a predefined temperature value and a predefined viscosity value; and
        an association between each of the plurality of different predetermined combinations and a particular shelf life value of the one or more shelf life values; and
    a control circuit secured by the housing and operatively coupled with the pH sensor, the temperature sensor, the viscosity sensor, the ultrasonic generator, and the memory, the control circuit configured to:
        receive a desired shelf life value of the one or more shelf life values;
        obtain, from the memory, a first predetermined combination of the plurality of different predetermined combinations corresponding to the desired shelf life value;
        control an operation of the ultrasonic generator;
        determine the pH value based on the first measurement, the temperature value based on the second measurement, and the viscosity value based on the third measurement;
        determine whether each of the pH value, the temperature value, and the viscosity value are respectively within a corresponding threshold of a first predefined pH value, a first predefined temperature value, and a first predefined viscosity value of the first predetermined combination; and
        in response to the determination that each of the pH value, the temperature value, and the viscosity value are respectively within the corresponding threshold of the first predefined pH value, the first predefined temperature value, and the first predefined viscosity value, cause the ultrasonic generator to stop emitting the one or more sound waves to substantially halt the breakdown of the amylose of the sushi rice.

2. The sonication probe of claim 1, further comprising a motor cooperatively coupled to the control circuit, the one or more stirring members, and the viscosity sensor, the motor configured to rotate the one or more stirring members around a vertical axis of the housing to stir the sushi rice, wherein the control circuit is further configured to cause the motor to stop the rotation of the one or more stirring members in response to the determination that the viscosity value is within the corresponding threshold of the first predefined viscosity value.

3. The sonication probe of claim 1, wherein, in response to the determination that each of the temperature value and the viscosity value are respectively not within the corresponding threshold of the first predefined temperature value and the first predefined viscosity value, the control circuit is further configured to cause the ultrasonic generator to continue emitting the one or more sound waves until the temperature value and the viscosity value are respectively within the corresponding threshold of the first predefined temperature value and the first predefined viscosity value.

4. The sonication probe of claim 1, wherein the memory is further configured to store the desired shelf life value as one of a plurality of preset values accessible to the control circuit, and wherein the control circuit is further configured to automatically receive, at a subsequent time, the desired shelf life value when a user selects the desired shelf life value as a default value.

5. The sonication probe of claim 4, further comprising a display unit operatively coupled to the control circuit, the display unit configured to:
    display at least one of options of the one or more shelf life values and the plurality of preset values; and
    receive a selection from the at least one of the options and the plurality of preset values by a user, wherein the received desired shelf life value of the control circuit is based on the selection.

6. The sonication probe of claim 1, further comprising an adapter unit configured to detachably attach the sonication probe to a rice cooker.

7. A system utilizing a sonication probe to cook rice comprising:
    a rice cooker configured to cook rice;
    one or more stirring members configured to stir the rice;
    a motor coupled to the rice cooker and the one or more stirring members, the motor configured to rotate the one or more stirring members;
    a sonication probe coupled to the motor and the one or more stirring members, the sonication probe comprises:
        a housing coupled to the one or more stirring members;
        a pH sensor secured by the housing, the pH sensor configured to provide a first measurement of a pH value associated with the rice;

a temperature sensor secured by the housing, the temperature sensor configured to provide a second measurement of a temperature value associated with the rice;

a viscosity sensor secured by the housing, the viscosity sensor configured to provide a third measurement of a viscosity value associated with the rice; and an ultrasonic generator secured by the housing, the ultrasonic generator configured to emit one or more sound waves within one or more sets of predefined frequency ranges to break down amylose of the rice;

a memory configured to store:

one or more shelf life values;

a plurality of different predetermined combinations each comprising a predefined pH value, a predefined temperature value and a predefined viscosity value; and an association between each of the plurality of different predetermined combinations and a particular shelf life value of the one or more shelf life values; and a control circuit operatively coupled to the rice cooker, the motor, the sonication probe, and the memory, the control circuit configured to:

receive a desired shelf life value of the one or more shelf life values;

obtain, from the memory, a first predetermined combination of the plurality of different predetermined combinations corresponding to the desired shelf life value;

control an operation of the ultrasonic generator;

determine the pH value based on the first measurement, the temperature value based on the second measurement, and the viscosity value based on the third measurement;

determine whether each of the pH value, the temperature value, and the viscosity value are respectively within a corresponding threshold of a first predefined pH value, a first predefined temperature value, and a first predefined viscosity value of the first predetermined combination; and in response to the determination that each of the pH value, the temperature value, and the viscosity value are respectively within the corresponding threshold of the first predefined pH value, the first predefined temperature value, and the first predefined viscosity value, cause the ultrasonic generator to stop emitting the one or more sound waves to substantially halt breakdown of amylose of the rice.

8. The system of claim 7, wherein the memory is further configured to store the desired shelf life value as one of a plurality of preset values accessible to the control circuit, and wherein the control circuit is further configured to automatically receive, at a subsequent time, the desired shelf life value when a user selects the desired shelf life value as a default value.

9. The system of claim 8, further comprising a display unit operatively coupled to the control circuit, the display unit configured to:

display at least one of options of the one or more shelf life values and the plurality of preset values; and receive a selection from the at least one of the options and the plurality of preset values by a user, wherein the received desired shelf life value of the control circuit is based on the selection.

10. The system of claim 7, wherein the control circuit is further configured to cause the motor to stop the rotation of the one or more stirring members in response to the determination that the viscosity value is within the corresponding threshold of the first predefined viscosity value.

11. The system of claim 7, wherein, in response to the determination that each of the temperature value and the viscosity value are respectively not within the corresponding threshold of the first predefined temperature value and the first predefined viscosity value, the control circuit is further configured to cause the ultrasonic generator to continue emitting the one or more sound waves until the temperature value and the viscosity value are respectively within the corresponding threshold of the first predefined temperature value and the first predefined viscosity value.

12. The system of claim 7, wherein the memory is further configured to store the desired shelf life value as one of a plurality of preset values accessible to the control circuit, and wherein the control circuit is further configured to automatically receive, at a subsequent time, the desired shelf life value when a user selects the desired shelf life value as a default value.

13. The system of claim 7, further comprising an adapter unit coupled to the sonication probe, the adapter unit configured to detachably attach the sonication probe to the rice cooker.

* * * * *